US008751794B2

(12) United States Patent
Haulund

(10) Patent No.: US 8,751,794 B2
(45) Date of Patent: Jun. 10, 2014

(54) SYSTEM AND METHOD FOR SECURE NEWORK LOGIN

(75) Inventor: Jens Haulund, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 208 days.

(21) Appl. No.: 13/338,505

(22) Filed: Dec. 28, 2011

(65) Prior Publication Data
US 2013/0173915 A1 Jul. 4, 2013

(51) Int. Cl.
H04L 9/32 (2006.01)

(52) U.S. Cl.
USPC .............. 713/159; 713/155; 726/4; 726/7

(58) Field of Classification Search
USPC .......................................................... 713/159
See application file for complete search history.

(56) References Cited

U.S. PATENT DOCUMENTS

| 7,079,007 | B2* | 7/2006 | Siegel et al. ............... 340/5.52 |
| 7,634,802 | B2* | 12/2009 | Chiloyan ...................... 726/4 |
| 7,774,283 | B2 | 8/2010 | Das et al. |
| 8,407,762 | B2* | 3/2013 | Bidare ............................. 726/2 |
| 8,444,048 | B1* | 5/2013 | Nidamarthi et al. ........... 235/375 |
| 8,453,222 | B1* | 5/2013 | Newstadt et al. ............... 726/7 |
| 8,468,340 | B2* | 6/2013 | Moore et al. ................. 713/156 |
| 2003/0159030 | A1* | 8/2003 | Evans ........................... 713/154 |
| 2004/0083371 | A1* | 4/2004 | Algazi et al. ................ 713/186 |
| 2008/0091618 | A1 | 4/2008 | Obrea et al. |
| 2008/0095373 | A1* | 4/2008 | Nagata et al. ................ 380/278 |
| 2008/0209521 | A1* | 8/2008 | Malaney ....................... 726/4 |
| 2008/0282331 | A1 | 11/2008 | Teo |
| 2009/0077640 | A1 | 3/2009 | Wang |
| 2009/0300744 | A1* | 12/2009 | Guo et al. ..................... 726/7 |
| 2010/0024024 | A1 | 1/2010 | Siourthas et al. |
| 2010/0070759 | A1* | 3/2010 | Leon Cobos et al. ......... 713/155 |
| 2010/0146605 | A1 | 6/2010 | Hammell et al. |
| 2010/0287606 | A1* | 11/2010 | Machani ....................... 726/7 |
| 2010/0309505 | A1 | 12/2010 | Partridge et al. |

OTHER PUBLICATIONS

B. Dodson et al., "Secure, Consumer-Friendly Web Authentication and Payments with a Phone", 2010, pp. 1-21.*
Tanaka et al., "A Method and Its Usability for User Authentication by Utilizing a Matrix Code Reader on Mobile Phones", 2007, pp. 1-12.*
International Search Report and Written Opinion in PCT/US 12/65436 Jan. 29, 2013.

* cited by examiner

Primary Examiner — Kambiz Zand
Assistant Examiner — Yonas Bayou
(74) Attorney, Agent, or Firm — Brian A. Lemm; Charles R. Malandra, Jr.; Steven J. Shapiro

(57) ABSTRACT

Systems and methods for providing an expedited login process that is relatively fast and that still provides a reasonable level of security and a reasonable method for mitigating compromised login information are described. In one configuration, a web server sends an anonymous unique machine readable login identifier code to a browser display of a client computer. A server account holding user then uses his smartphone to scan the code and send a message including the login identifier code and a smartphone identifier code to the server. The server obtains the identity of the user and authenticates the user by determining possession of the smartphone using the smartphone identifier. The server then uses the login identifier code to log the user into the server and into the user account at the client computer.

1 Claim, 5 Drawing Sheets

SYSTEM AND METHOD FOR SECURE NEWORK LOGIN

FIELD OF THE INVENTION

The present invention relates to systems and methods for user authentication on a network and more particularly to systems and methods for using a code scanning handheld such as a cellular telephone to provide expedited user authentication to a website.

BACKGROUND OF THE INVENTION

Many companies provide computer network access to their customers such as by providing them access to an Internet web hosting server. Frequently, the customers are required to enter a unique user identification (user ID, username) and an appropriate password in order to obtain access to the customer's account data using the web hosting server. Customers who have many accounts may need to remember many different username/password pairs or may instead reuse username/password pairs with multiple companies. Customer's may forget their username/password information and may become frustrated during multiple login attempts over a long period of time. Additionally, there have been many instances in which large numbers of passwords have been compromised in single-factor systems. Even two-factor systems have been spoofed in the past. If one or more of a username/password credential of a user is compromised, it may be some time before the user learns of the compromised credential. If such credential is used for multiple accounts at servers, then it may take significant time to remediate the problem of a compromised credential.

Single-factor, single-channel authentication systems often use a known secret, the password, as a something you know authentication factor delivered over the primary network communication channel. However, such systems suffer from the deficiency that they collectively cause users to waste significant time because of username/password problems above. Accordingly, there are several disadvantages of currently available systems and methods for user authentication including single factor username/password authentication schemes that collectively waste significant amounts of time.

Among many needs in the user authentication field, there is a need for an expedited login process that is relatively fast and still provides a reasonable level of security and a reasonable method for mitigating compromised login in formation.

SUMMARY

The illustrative embodiments of the present application describe systems and methods for providing an expedited login process including user authentication using a token and access to a user account on a server. In certain configurations single factor authentication is utilized based upon possession of an object such as a personal device comprising a smartphone as a token. In one alternative, a single communications channel is used and in another alternative, two communications channels are utilized. In additional configurations, one or more additional authentications factors selected from a group including knowledge of a secret and user physical characteristics are utilized. Additionally, location information is used in one alternative to further authenticate the login request.

In one illustrative configuration, systems and methods for authenticating a user using a client device to the server computer are described. A system receives an access request from the client device using a network. It sends a unique login identifier to the client device. The system receives a message from the user including a personal user device identifier and the unique login identifier. The system determines an identity of the user using the personal user device identifier and determines a server access request response associated with the user and the client device using the unique login identifier. The system then logs in the user to the server on the client device.

In another illustrative configuration, systems and methods for authenticating a user using a client device to the server computer are described. A user sends an access request to the server using the first client device and a network that is operatively connecting the server and the first client device. The user receives a unique login identifier from the server at the client device as a displayed machine readable code via the network. The user scans the displayed machine readable code using a personal user device to obtain the unique login identifier. The user sends a cryptographically secured message from the personal user device that includes a personal user device identifier and the unique login identifier, wherein the unique login identifier is further cryptographically secured, and then, the user interacts with the server on the client device to access a user account on the server that is logged-in as a result of sending the message.

In another illustrative configuration, systems and methods for providing an expedited login process that is relatively fast and that still provides a reasonable level of security and a reasonable method for mitigating compromised login information are described. A server such as a web server sends an anonymous unique machine readable login identifier code to a browser display of a client device such as a personal computer. A user having an account on that server then uses his personal device such as a smartphone to scan the code and send a message including the login identifier code and a smartphone identifier code to the server. The server obtains the identity of the user and authenticates the user by determining possession of the smartphone using the smartphone identifier. The server then uses the login identifier code to log the user into the server and into the user account at the client computer. In yet another alternative illustrative configuration, the server obtains relative or absolute geographic position information for the smartphone and utilizes that information along with known acceptable locations for a user to determine whether to provide the user with access to the user account. Alternatively, the system compares the location of the smartphone and location information providing the location of the client computer in order to provide user account access only if the two locations are reasonably close together. If the user loses or misplaces the smartphone, the user may separately access the server or a central server to deactivate the smartphone access credential. The central server then notifies all of the appropriate servers of the change.

In yet another illustrative embodiment, systems and methods directed to providing a secure login process are described. Here, the system displays username/password interaction fields in a web login page. When the username and password are entered, the system utilizes a public key associated with the user to encrypt or digitally sign the username/password combination and then dynamically generates a two dimensional barcode encoding the cryptographically processed username and password. The barcode also includes a unique login identifier to identify the client computer session. The user then scans the barcode with the smartphone. The smartphone uses the associated private key to decrypt or authenticate username/password combination and sends the username/password, login identifier and any other data obtained from the barcode through a secure communications channel to the web server. The web server then authenticates the user with the username and password. The server also obtains relative or absolute geographic position information for the smartphone and utilizes that information along with known acceptable locations for a user to determine whether to provide the user with access to the user account. If authorized, the web server redirects the user from the login page to a user account session. In an alternative, the username and password are not cryptographically processed, but stored in the two dimensional barcode in the clear and transmitted to the server through a secure communications channel such as an SSL tunnel.

In yet another illustrative embodiment, systems and methods directed to mitigating compromised credentials are described. If a user loses or misplaces the smartphone used with the system, the user may contact a single server to temporarily or permanently halt access based upon possession of the smartphone. Similarly, if suspicious telephone or server access activity is noted by one or more servers, an additional security factor may be required.

Several additional alternative configurations are also described below.

BRIEF DESCRIPTION OF THE DRAWINGS

The accompanying drawings illustrate several embodiments of the application, and together with the general description given above and the detailed description given below, serve to explain certain principles of the invention. As shown throughout the drawings, like reference numerals designate like or corresponding parts.

DETAILED DESCRIPTION

The illustrative embodiments of the present application describe systems and methods for providing an expedited login process including user authentication using a token and access to a user account on a server. In other illustrative embodiments, more secure systems and methods are described. In certain configurations single factor authentication is utilized based upon possession of an object such as a personal device comprising a smartphone as a token. In one alternative, a single communications channel is used and in another alternative, two communications channels are utilized. In additional configurations, one or more additional authentications factors selected from a group including knowledge of a secret and user physical characteristics are utilized. Additionally, location information is used in one alternative to further authenticate the login request. The illustrative embodiments of the present application are provided to describe illustrative systems and methods that address needs in the marketplace including but not limited to expedited login processes, secure login processes and login processes that provide for convenient token loss mitigation.

Figure 1A:
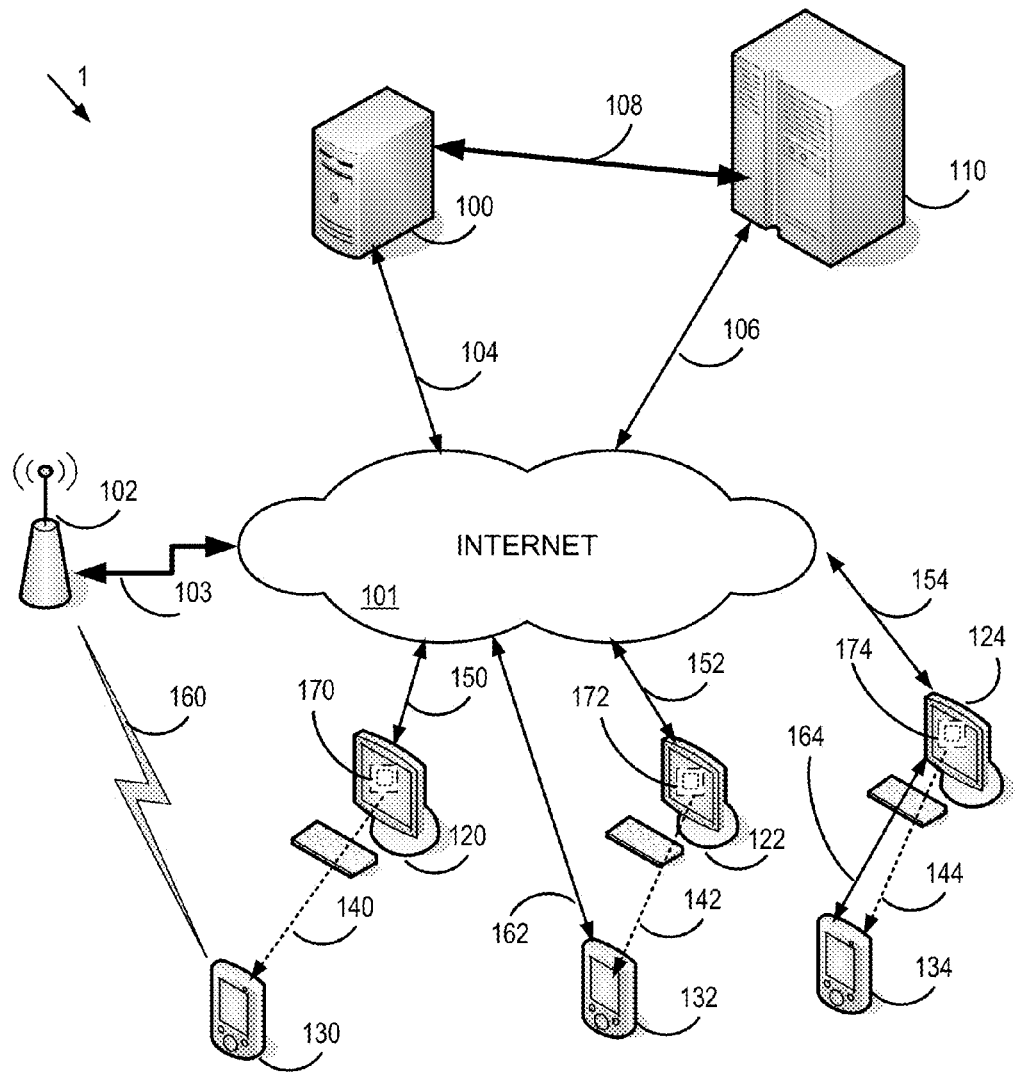
FIG. 1A is a schematic diagram of a system for providing an expedited login process to a server using an authentication process that includes using a smartphone as a token identifier according to an illustrative embodiment of the present application.

Referring to FIG. 1A, a schematic diagram of a system 1 for providing an expedited login process to an account server 110 using an authentication process that includes using a smartphone as a token identifier according to an illustrative embodiment of the present application is shown. An administration login server 100 is utilized, but the functions of the login server 100 may be combined with those of account server 110. In the embodiments, account server 110 includes data storage that includes user account data and a user access profile. The profile includes an identifier for the user personal device such as a unique device ID for the user's smartphone. Moreover, the user access profile may include location and time based access restriction data.

Several illustrative user client devices are shown including a desktop personal computer 120, a laptop personal computer 122 and a tablet personal compute 124. Here the desktop personal computer 120 is connected to the Internet 101 using a wired connection 150, the laptop personal computer 122 uses a wireless LAN connection 152 and the tablet personal computer 124 uses a wireless LAN connection 154 or wireless WAN/cellular alternative. Each of the user client devices is a DELL desktop, laptop or tablet respectively and executes a WINDOWS 7 operating system and an INTERNET EXPLORER browser. Each client device includes at least one processor, display, input such as a keyboard and mouse, RAM memory for data and instructions, disk memory, network and external storage connections. Client devices 120, 122, 124 each include displays capable of displaying a two dimensional barcode in the QR CODE format, respectively 170, 172, 174 that may be scanned or read by personal devices 130, 132, 134 optically 140, 142, 144.

Several illustrative user personal devices are shown including a smartphone 130, smartphone 132 and camera cell phone 134. A PDA or tablet or other portable processor may be utilized as the personal devices. Here the smartphone 130 is connected to a cellular data network 160 to tower 102 that is connected to the Internet 101 using connection 103. Smartphone 132 is connected to the internet 101 using wireless LAN connection 162. The camera cell phone 134 is connected to the Internet 101 using wireless LAN connection 164 through the tablet computer 124 as a proxy server. Each of the smartphone, camera cell phone and tablet is an appropriate MOTOROLA device such as a DROID 3 or XYBOARD executing the ANDROID operating system. Each personal device includes at least one processor, a CCD camera or other code scanner, display, input such as a touch screen, RAM memory for data and instructions, disk memory, network and external storage connections.

The Server 100 includes a DELL POWEREDGE M1000E server, but other servers such as a SUN T5240 server may be used including geographically dispersed and/or load balanced servers. Server 100 includes at least one processor, RAM memory for data and instructions, disk memory, network and external storage connections. The Server 110 includes an IBM POWER 795 Server, but other servers such as an ORACLE IPLANET Web Server may be utilized. Server 110 includes at least one processor, RAM memory for data and instructions, disk memory, network and external storage connections. Here, server 100 is connected to server 110 using a LAN connection 108, but connection 108 could include a long distance connection such as a VPN tunnel using the Internet 101. Server 100 and server 110 are connected to the Internet 101 using LAN connections 104 and 106 respectively.

Here, the Internet 101 is utilized for many of the network connections of the system 1, but other networks including LAN, WAN, cellular, satellite and other wired and/or wired networks may be used for one or more of the interconnections shown. The databases storing user login information and user account information may be configured using an available relational database such as ORACLE 12i or MICROSOFT SQL server. Any or all of the databases may be resident in a single server or may be geographically distributed and/or load balanced. They may be retrieved in real time or near real time using networking such as web services connected to third party data providers. Many alternative configurations may be used including multiple servers and databases including a geographically distributed system. The processes described herein may be implemented in C++, Java, C# on a MICROSOFT WINDOWS 7 platform and utilize the MICROSOFT SHAREPOINT content management system with "dot net" programs. Alternatively, PHP code may be used with open source systems such as the JOOMLA content management system and APACHE web server with MYSQL databases. Additionally, Ajax and XMLHttpRequest objects may be used to perform an html redirect from a login server to an account server.

Figure 1B:
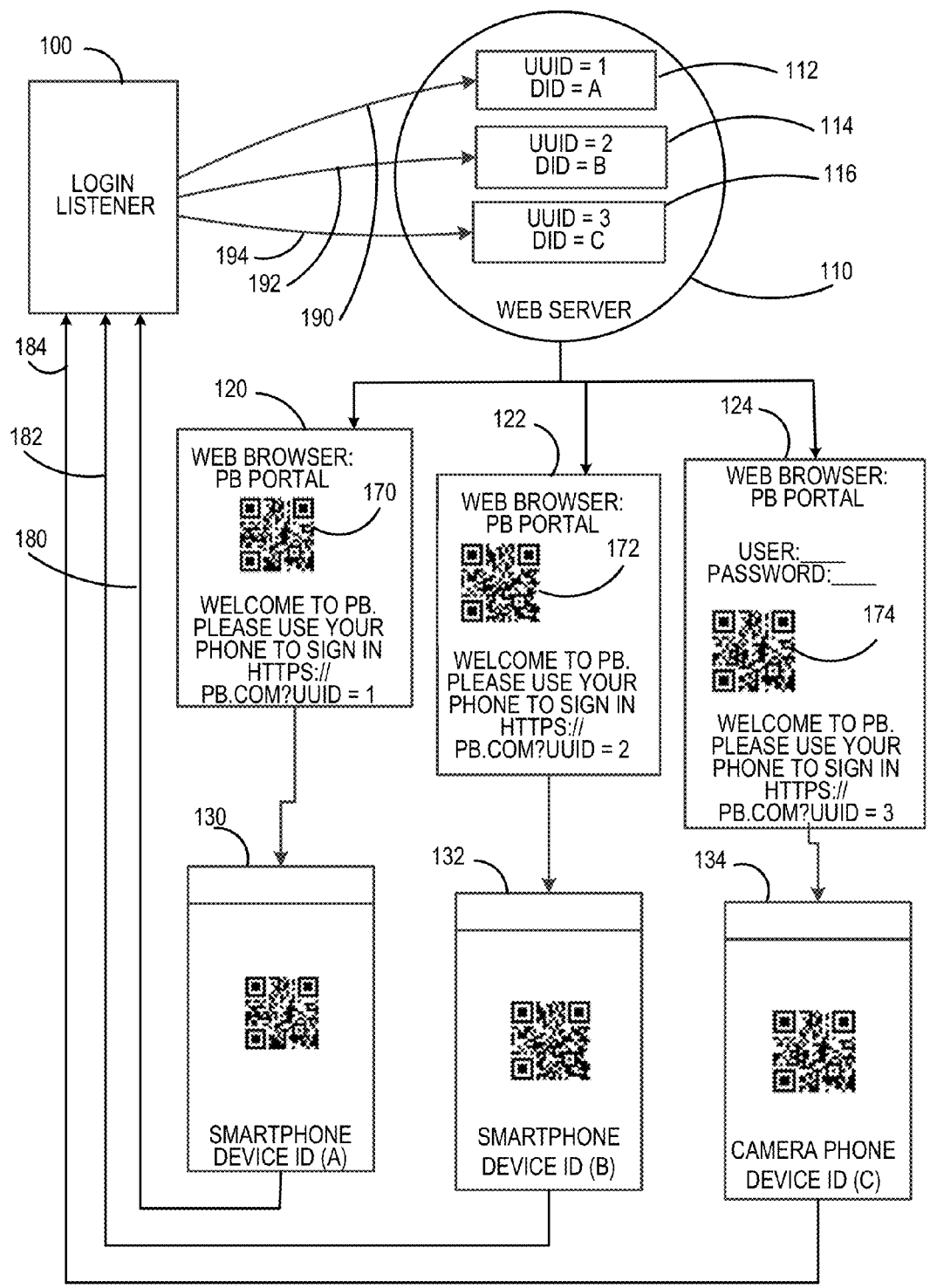
FIG. 1B is a schematic diagram and information flow diagram of a system for providing an expedited login process to a server using an authentication process that includes using a smartphone as a token identifier according to an illustrative embodiment of the present application.

Referring to FIG. 1B, a schematic diagram and information flow diagram of a system for providing an expedited login process to a server using an authentication process that includes using a smartphone as a token identifier according to an illustrative embodiment of the present application is shown.

The administration login server 100 is configured as a login listener as described herein. The account web server 100 generates HTML login portal pages shown in client browser 120 on demand that are pushed to the client device browser 120 upon receipt of an HTTP request such as a GET request. Here, the HTML login portal page includes a message and a two dimensional barcode 170 encoding at least a login universal identifier. In this embodiment, a URL for the login listener is provided. Here, the universal identifier is generated to be at least locally unique to the application and utilizes the UUID protocol, using an appropriate version of the protocol so that the login portal page requests will not be ambiguous. The smartphone 130 is utilized by the user to scan the barcode 170 to obtain the UUID for the login request.

The smartphone then creates a message 180 including the UUID of code 170, here UUID=1 and a unique Device ID for the personal device smartphone 130, here DID=A. The unique device ID includes a unique device identifier and could utilize the MAC address, a smartphone serial number and/or another UUID as appropriate. The smartphone utilizes the listener URL obtained from the barcode 170 to direct message 180 to the login listener server 100. Message 180 may be sent through a secure channel such as an SSL secured wireless channel. The login listener server 100 then passes the message 112 to the application web server 110 along path 190. The web server 110 then first determines if the message 112 is a valid issued login UUID. If the UUID is valid, then the smartphone ID is utilized to obtain the user identity. The user is then logged into the system and into the user account such as by HTTP redirect to a logged in session. Several different session mechanisms are known and can be utilized herein. For example, HTTP cookies or URL parameter passed session IDs may be used.

In an alternative, encryption techniques are used to confirm the correct smartphone is being used. The account web server 100 generates HTML login portal pages shown in client browser 122. Here, the HTML login portal page includes a message and a two dimensional barcode 172 encoding at least the login universal identifier. In this embodiment, a URL for the login listener is provided and a challenge datum may be provided. The smartphone 132 is utilized by the user to scan the barcode 172 to obtain the UUID for the login request. The smartphone 132 then creates a message 182 including the UUID of code 172, here UUID=2 and a unique Device ID for the personal device smartphone 132, here DID=B. The smartphone then cryptographically secures at least some of the data from barcode 170 such as the UUID, the URL, the challenge datum or some combination of all or parts of that data. Message 182 is sent through a secure channel such as an SSL secured channel.

The smartphone utilizes the listener URL obtained from the barcode 172 to direct message 182 to the login listener server 100. The login listener server 100 then passes the message 114 to the application web server 110 along path 192. The web server 110 then first determines if the message 114 is a valid issued login UUID by obtaining the appropriate public key and using the appropriate cryptographic process to confirm the smartphone. Then, if the UUID is valid, the smartphone ID is utilized to obtain the user identity. The user is then logged into the system and into the user account such as by HTTP redirect to a logged in session.

In another alternative, encryption techniques and a username/password are used to confirm the correct smartphone is being used and that a second factor secret of username/password is provided for additional account security. The account web server 100 generates HTML login portal pages shown in client browser 124. Here, the user must enter a username and password into a dialog box or through some other known method. The HTML login portal page includes a message and a dynamically generated two dimensional barcode 174 encoding at least the login universal identifier and the username/password. The smartphone 134 is utilized by the user to scan the barcode 174 to obtain the UUID, username and password for the login request. The smartphone 134 then utilizes a private key to creates a message 184 including the UUID of code 174, here UUID=3 and a unique Device ID for the personal device smartphone 134, here DID=C. The message also includes a cryptographically processed version of the username/password such as a digitally signed or an encrypted version. Message 184 is sent through a secure channel such as an SSL secured channel.

The smartphone utilizes the listener URL obtained from the barcode 174 to direct message 184 to the login listener server 100. The login listener server 100 then passes the message 116 to the application web server 110 along path 194. The web server 110 then first determines if the message 116 is valid by obtaining the appropriate public key for that DID=C and using the appropriate cryptographic process to confirm the username/password. Then, if the username/password is valid and the UUID is valid, the smartphone ID is utilized to obtain the user identity. The user is then logged into the system and into the user account such as by HTTP redirect to a logged in session.

In another alternative, the message 184 includes location information of the smartphone. Because the smartphone is providing the user location when the two dimensional barcode (here a QR format code), is scanned, the user can setup an access profile. Here, the user configures an access profile when registering the smartphone 134 for use with the account server 110. The user specifies acceptable absolute or relative locations or regions from which to allow access to the account on server 110. For example, if a user wishes to restrict all banking to his home, the user can restrict access to transactions initiated with the smartphone at the home location or within a 0.1 mile radius of his home. Therefore, even if the smartphone were lost or stolen, an unauthorized user will not be allowed access to the account on server 110 unless with the set location range. Similarly, the user access profile may include time based restrictions. For example, the user may allow access to the account only from 6-9 p.m., New York time. Additionally, as with any embodiment herein, the profile can be set to lock out all electronic access to the account outside of the account institution if a certain number of failed login attempts are attempted such as 1, 3, 10 or other reasonable number of failed login attempts. If all login requirements are met, the user is then logged into the system and into the user account such as by HTTP redirect to a logged in session.

The unique login identifier may be locally unique to the particular website server in use and may be locally unique for a period of time such as 1 hour, 1 day, 1 week, 1 year or other period of time to ensure that the login identifiers being used will not overlap to create an ambiguity. For example, the Login ID may be unique for a particular sub-site such as for access to a particular credit card site at a bank, or may be unique more globally across all web sites published by the bank. Moreover, the login identifiers may be unique across multiple companies and websites and may be globally unique forever or for a period of time as described above. If a UUID is utilized, any appropriate variant or version of the standard may be used.

In yet another alternative applicable to any of the applicable embodiments herein, a smartphone application can be provided to communicate with a login listener that services many distinct web servers for several companies. In such an alternative, the UUID pushed by the web server is globally unique for all served web servers and the URL for the login listener server 100 may or may not be provided in the barcode. The smartphone application may be programmed with the URL for the login listener and can receive and process the globally unique UUID to determine the appropriate web server. In such a distributed system, the connections from the login listener 100 to multiple web servers would be through secure channels.

Figure 2:
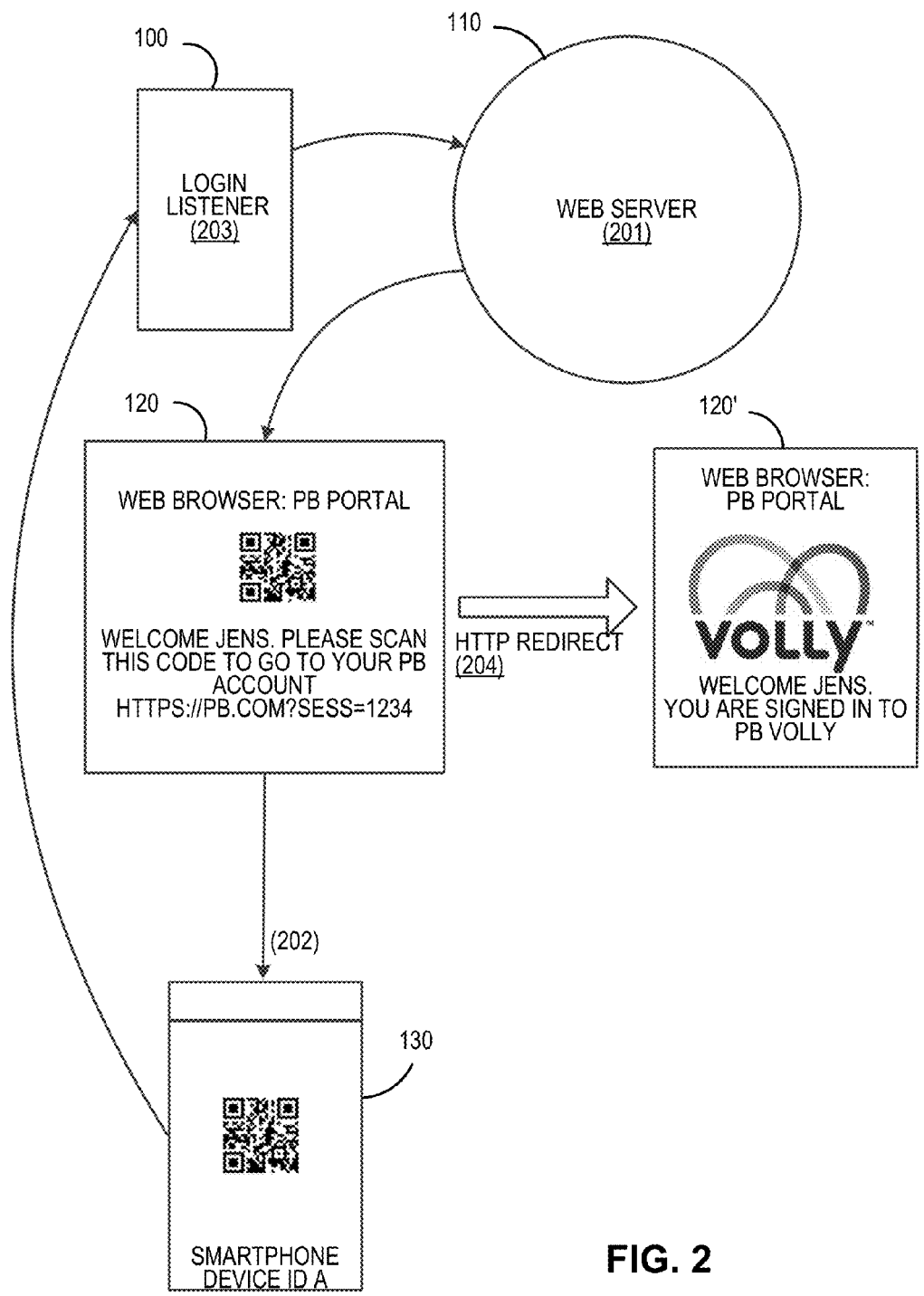
FIG. 2 is an information flow diagram of a system for providing an login process to a server using an authentication process that includes a two stage login process using a smartphone as a token identifier in a second stage according to an illustrative embodiment of the present application.

Referring to FIG. 2, an information flow diagram of a system for providing an login process to a server using an authentication process that includes a two stage login process using a smartphone as a token identifier in a second stage according to an illustrative embodiment of the present application is shown.

Here, the user has provided a username and password into a traditional login dialog box using client device web browser 120 connected to the web server 110. Here, in step 201, the Web Server utilizes the username and password to identify the user and to obtain a public key associated with the user and the associated account. The web Server 110 then creates a unique session ID for an account access session associated with the user. The session ID and URL are encrypted with the user's public PKI key and encoded into a two dimensional barcode such as a QR format code that is then displayed to the user on the client device 120. In step 202, the smartphone 130 is used to scan the barcode and using the smartphone private PKI key, to decrypt the information. The URL and session ID are then used to contact the Login Listener server 100 in step 203. The login listener Server communicated with Web Server 110 which then logs the user into the account such as by HTTP redirect in step 204 into a new browser window 120'.

In an alternative, the encrypted barcode contains sufficient information to log into the account without accessing the login listener 100. Similarly, as described above, the location and time based account access restrictions may be implemented in this embodiment.

Several additional illustrative systems that may be utilized are described herein. In one illustrative system, a server system for authenticating a user using a client device to the server is provided. The server includes memory storing processor-executable instructions; and a processor in communication with the memory and operative in conjunction with the memory to execute the stored instructions. The programmed server is configured to receive an access request from the client device using a network; send a unique login identifier to the client device; receive a message originating from the user including a personal user device identifier and the unique login identifier; determine an identity of the user using the personal user device identifier; determine a server access request response associated with the user and the client device using the unique login identifier; and log in the user to the server on the client device.

In another illustrative alternative, the message is cryptographically secured in transit from the user to the server computer, the personal user device identifier is encoded in a machine readable code, and the unique login identifier is further cryptographically secured in the message. In yet another illustrative alternative, the machine readable code is a two dimensional barcode, the unique login identifier is cryptographically secured with a cryptographic process selected from the group consisting of a digital signature process and an encryption process, determining the identity of the user includes confirming the personal user device identifier using an applicable cryptographic process.

In yet another illustrative alternative, the network comprises a wide area network, the client device comprises a personal computer and includes a web browser for displaying the machine readable code, sending the unique login identifier to the client device includes sending a login web page to the client device browser, the machine readable code comprises a two dimensional barcode in a QR code format, the personal user device comprises a smartphone having an image capture device, the personal user device obtains the unique login identifier using the image capture device to read the two dimensional barcode from a display of the client device personal computer, receiving the message is accomplished by using a cellular network to receive a message from the smartphone; and logging in the user to the server on the client device includes a web redirect from the login web page to a user page for a user session.

In yet another alternative, the programmed server is further configured to obtain an additional security factor datum to the server selected from the group consisting of a password from the user and biometric data from the user; and deny access to a user account on the server unless the additional security factor datum is determined to be acceptable for the user account.

Figure 3:
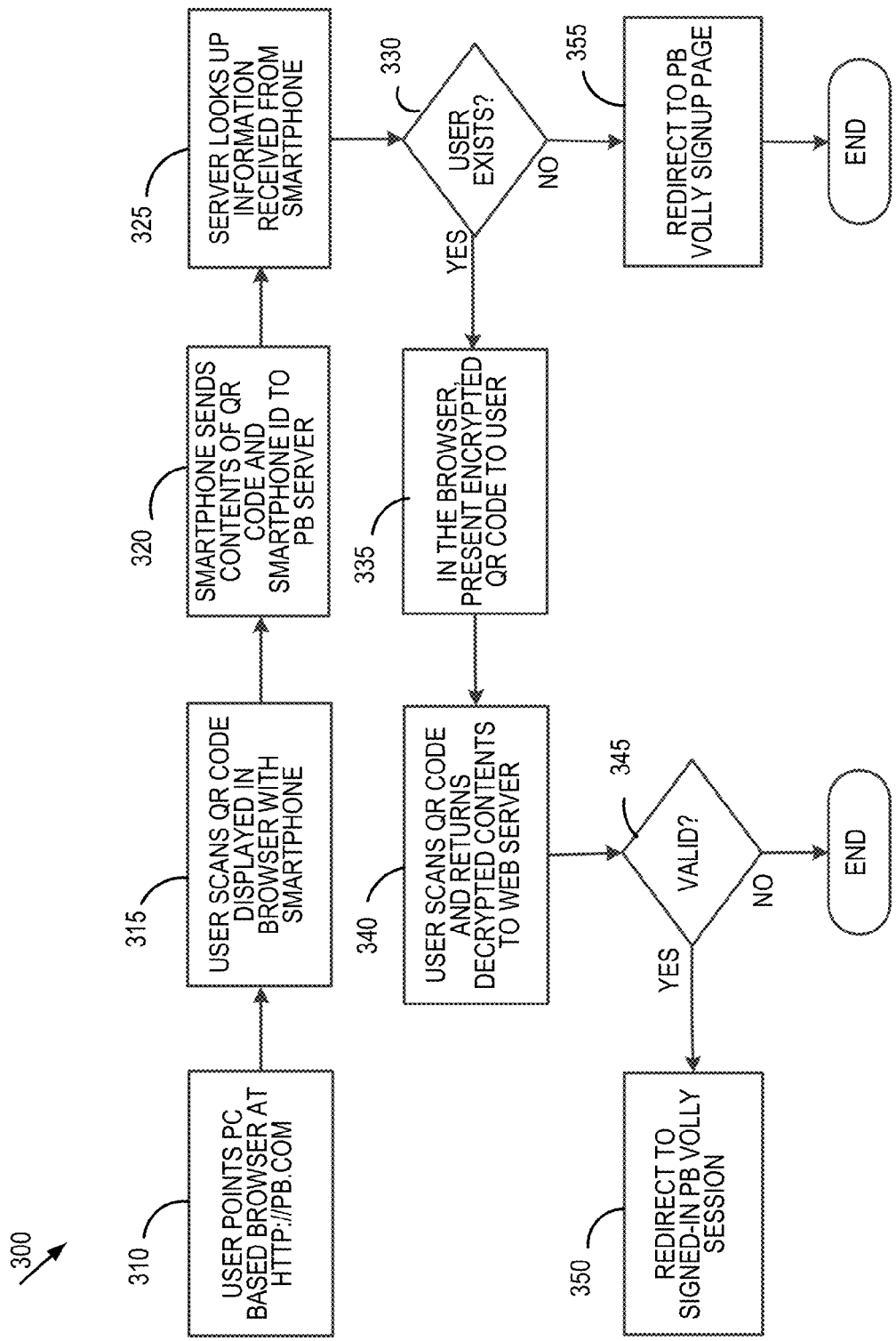
FIG. 3 is a flowchart showing an illustrative process for providing an expedited login process to a server using an authentication process that includes using a smartphone as a token identifier according to an illustrative embodiment of the present application.

Referring to FIG. 3, a flowchart showing an illustrative process 300 for providing an expedited login process to a server using an authentication process that includes using a smartphone as a token identifier according to an illustrative embodiment of the present application is shown.

In step 310, the user points his PC based browser at a URL or selects a shortcut to a web server. The web server then sends a QR code to the user's browser. The QR code includes a unique login ID. In step 315, the user scans the QR code displayed in the browser with the smartphone. In step 320, the smartphone sends the contents of the QR code and a smartphone identifier to the web server or an associated login server. In step 325 the server uses the smartphone ID to determine if a registered user is associated with the smartphone. In step 330, the method determines if the user is registered with the system. If so, in step 335, the server sends a second encrypted QR code including a session ID encrypted with the user's public key. In step 340, the user scans the second QR code and uses the smartphone and private PKI key to decrypt the contents. In step 345, if the decrypted contents are valid, the user is redirected in step 350 to a signed in account session. If the contents are not valid in step 345, then the process terminates.

If the user is not registered with the system in step 330, then the method proceeds to step 355 and redirects to a new user signup page and the process terminates.

Figure 4:
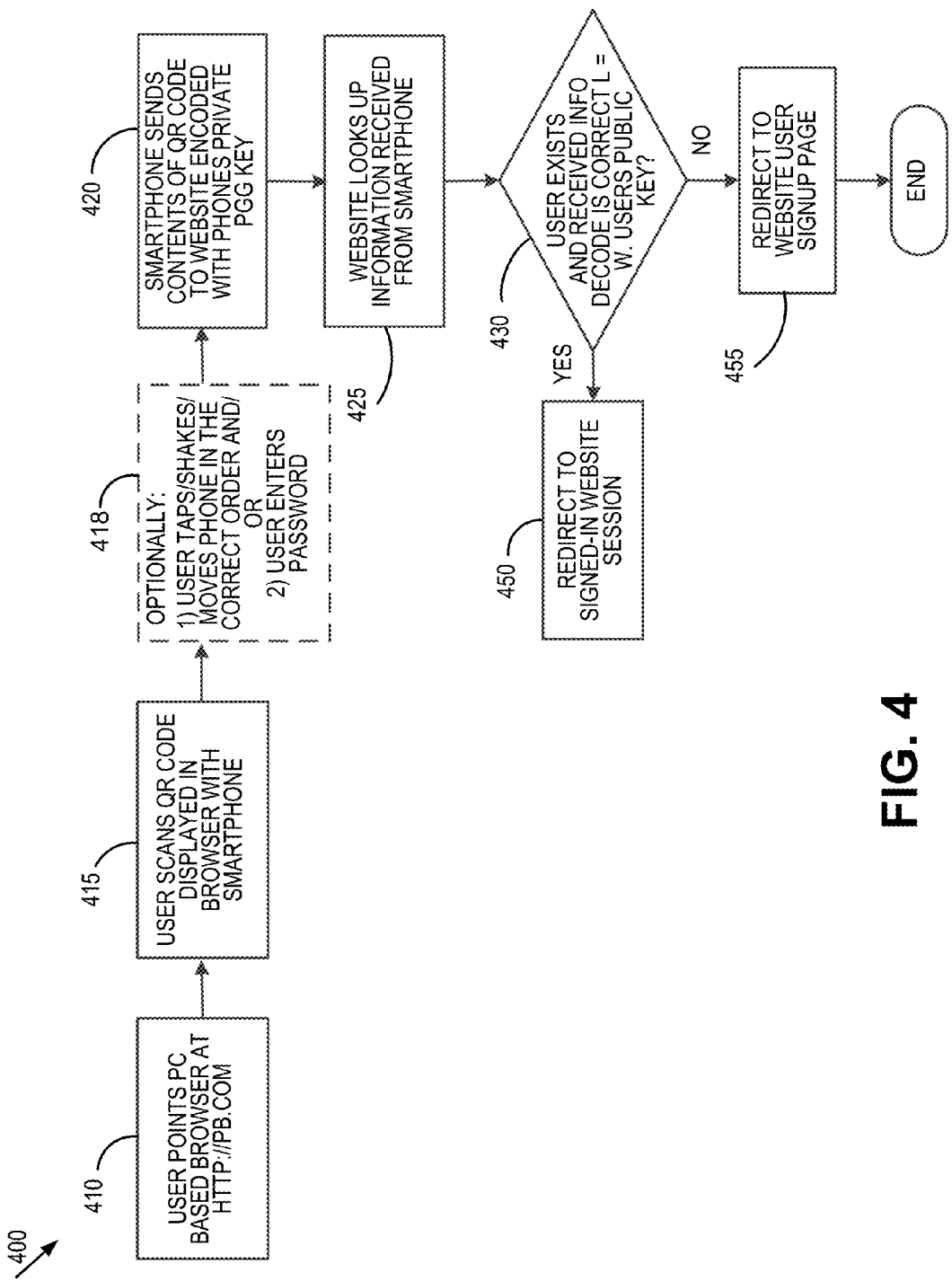
FIG. 4 is a flowchart showing an illustrative process for providing an expedited login process to a server using an authentication process that includes using a smartphone as a token identifier according to an illustrative embodiment of the present application.

Referring to FIG. 4, a flowchart showing an illustrative process 400 for providing an expedited login process to a server using an authentication process that includes using a smartphone as a token identifier according to an illustrative embodiment of the present application is shown.

In step 410, the user points his PC based browser at a URL or selects a shortcut to a web server. The web server then sends a QR code to the user's browser. The QR code includes a unique login ID. In step 415, the user scans the QR code displayed in the browser with the smartphone. In optional step 418, the user provides biometic information. Examples of biometric information include a retinal scan and a fingerprint scan. Additionally, the user may provide haptic feedback using the smartphone such as tapping/shaking and or moving the smartphone in a predetermined order. The user may also optionally enter secret information such as a username and or password/PIN, etc. In step 420, the smartphone sends the contents of the QR code and a smartphone identifier to the web server or an associated login server. The contents of the QR code are encrypted or signed with the private PKI key of the smartphone. In step 425 the server uses the smartphone ID to determine if a registered user is associated with the smartphone. In step 430, the method determines if the user is registered with the system by obtaining the public key and decrypting the encrypted information received. If the user is registered, in step 450, the server redirects the client browser to a logged in account session. If the user is not registered with the system in step 430, then the method proceeds to step 455 and redirects to a new user signup page and the process terminates.

Several additional embodiments are described herein. In one illustrative configuration, systems and methods for authenticating a user using a client device to the server computer are described. A system receives an access request from the client device using a network. It sends a unique login identifier to the client device. The system receives a message from the user including a personal user device identifier and the unique login identifier. The system determines an identity of the user using the personal user device identifier and determines a server access request response associated with the user and the client device using the unique login identifier. The system then logs in the user to the server on the client device.

In another illustrative configuration, systems and methods for authenticating a user using a client device to the server computer are described. A user sends an access request to the server using the first client device and a network that is operatively connecting the server and the first client device. The user receives a unique login identifier from the server at the client device as a displayed machine readable code via the network. The user scans the displayed machine readable code using a personal user device to obtain the unique login identifier. The user sends a cryptographically secured message from the personal user device that includes a personal user device identifier and the unique login identifier, wherein the unique login identifier is further cryptographically secured, and then, the user interacts with the server on the client device to access a user account on the server that is logged-in as a result of sending the message.

In another illustrative configuration, systems and methods for providing an expedited login process that is relatively fast and that still provides a reasonable level of security and a reasonable method for mitigating compromised login information are described. A server such as a web server sends an anonymous unique machine readable login identifier code to a browser display of a client device such as a personal computer. A user having an account on that server then uses his personal device such as a smartphone to scan the code and send a message including the login identifier code and a smartphone identifier code to the server. The server obtains the identity of the user and authenticates the user by determining possession of the smartphone using the smartphone identifier. The server then uses the login identifier code to log the user into the server and into the user account at the client computer. In yet another alternative illustrative configuration, the server obtains relative or absolute geographic position information for the smartphone and utilizes that information along with known acceptable locations for a user to determine whether to provide the user with access to the user account. Alternatively, the system compares the location of the smartphone and location information providing the location of the client computer in order to provide user account access only if the two locations are reasonably close together. Similarly, the user may limit access to particular time windows. If the user loses or misplaces the smartphone, the user may separately access the server or a central server to deactivate the smartphone access credential. The central server then notifies all of the appropriate servers of the change.

In yet another illustrative embodiment, systems and methods directed to providing a secure login process are described. Here, the system displays username/password interaction fields in a web login page. When the username and password are entered, the system utilizes a public key associated with the user to encrypt or digitally sign the username/password combination and then dynamically generates a two dimensional barcode encoding the cryptographically processed username and password. The barcode also includes a unique login identifier to identify the client computer session. The user then scans the barcode with the smartphone. The smartphone uses the associated private key to decrypt or authenticate username/password combination and sends the username/password, login identifier and any other data obtained from the barcode through a secure communications channel to the web server. The web server then authenticates the user with the username and password. The server also obtains relative or absolute geographic position information for the smartphone and utilizes that information along with known acceptable locations for a user to determine whether to provide the user with access to the user account. If authorized, the web server redirects the user from the login page to a user account session. In an alternative, the username and password are not cryptographically processed, but stored in the two dimensional barcode in the clear and transmitted to the server through a secure communications channel such as an SSL tunnel.

In yet another illustrative embodiment, systems and methods directed to mitigating compromised credentials are described. Initially, the smartphone may utilize a PIN or other password to permit only authorized user access. Moreover, if a user loses or misplaces the smartphone used with the system, the user may contact a single server to temporarily or permanently halt access based upon possession of the smartphone. Similarly, if suspicious telephone or server access activity is noted by one or more servers, an additional security factor may be required.

Several additional illustrative methods that may be utilized are described herein. In one illustrative method executing on a server for authenticating a user using a client device to the server computer, the method includes receiving an access request from the client device using a network, sending a unique login identifier to the client device, receiving a message from the user including a personal user device identifier and the unique login identifier, determining an identity of the user using the personal user device identifier, determining a server access request response associated with the user and the client device using the unique login identifier, and logging in the user to the server on the client device.

In an alternative method, the message is cryptographically secured in transit from the user to the server computer, the unique login identifier is encoded in a machine readable code, and the personal user device identifier is further cryptographically secured in the message. In another alternative method, the machine readable code is a two dimensional barcode, the unique login identifier is cryptographically secured with a digital signature or encryption by the user, and determining the identity of the user includes confirming the unique login identifier using an appropriate cryptographic system.

In yet another alternative method, the method also includes receiving a username and password from the user, and dynamically creating the machine readable code to include the username, the password, the unique login identifier and the personal user device identifier.

In yet another alternative method, the network comprises a wide area network, the client device comprises a personal computer and includes a web browser for displaying the machine readable code, sending the unique login identifier to the client device includes sending a login web page to the client device browser, the machine readable code comprises a two dimensional barcode in a QR code format, the personal user device comprises a smartphone having an image capture device, the personal user device obtains the unique login identifier using the image capture device to read the two dimensional barcode from a display of the client device personal computer, receiving the message is accomplished by using a cellular network to receive a message from the smartphone, and logging in the user to the server on the client device includes a web redirect from the login web page to a user page for a user session.

In yet another alternative method, the method also includes obtaining an additional security factor datum from the user selected from the group consisting of a password from the user and biometric data from the user, and denying access to a user account on the server unless the additional security factor datum is determined to be acceptable for the user account.

In yet another alternative method, the method also includes obtaining location information identifying the location of the smartphone, and denying access to a user account on the server unless the location information is determined to be acceptable for the user account.

In yet another alternative method, the unique login identifier is globally unique and the message does not include a server address such as a Universal Resource Locator. In yet another alternative method, obtaining a password from the user is accomplished by using a cellular network to receive a message from the personal user device.

In yet another alternative method, the method also includes if the determined identity of the user is undetermined, then obtaining user information using a new user signup process before logging in the user to the server on the client device.

In one illustrative method executing on a client device and a personal user device for authenticating a user to a server computer, the method includes sending an access request to the server using the first client device and a network that is operatively connecting the server and the first client device, receiving a unique login identifier from the server at the client device as a displayed machine readable code via the network, scanning the displayed machine readable code using the personal user device to obtain the unique login identifier, sending a cryptographically secured message from the personal user device that includes a personal user device identifier and the unique login identifier, wherein the unique login identifier is further cryptographically secured, and then, interacting with the server on the client device to access a user account on the server that is logged-in as a result of sending the message.

In an alternative method, the machine readable code is a two dimensional barcode, and the unique login identifier is cryptographically secured with a digital signature by the user before being sent in the message.

In another alternative method, the machine readable code is a two dimensional barcode, the unique login identifier is encrypted using a private key associated with the user, and an associated public key has been sent to the server.

In yet another alternative method, the network comprises a wide area network, the client device comprises a personal computer and includes a web browser for displaying the machine readable code, receiving the unique login identifier at the client device includes receiving a login web page at the client device browser, the machine readable code comprises a two dimensional barcode in a QR code format, the personal user device comprises a smartphone having an image capture device, the personal user device obtains the unique login identifier using the image capture device to scan the two dimensional barcode from a display of the client device personal computer, sending the message is accomplished by using a cellular network to receive a message from the smartphone, and interacting with the server on the client device to access a user account that is logged-in as a result of sending the message includes receiving a web redirect from the login web page to a user page for a user session on the server.

In yet another alternative method, the method further includes sending an additional security factor datum to the server selected from the group of a password from the user and biometric data from the user.

In yet another alternative applicable to any of the relevant embodiments described herein, the user may enter his username and password into the smartphone rather than into the client device.

While several embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A computer implemented method executing on a server computer for a user using a client device to login to an account session with the server computer comprising:
  receiving an access request from user using the client device via a network;
  sending a two dimensional barcode including a unique login ID to the client device;
  receiving a user identifier and the unique login ID from a personal user device;
  using the user identifier to obtain a public key for the user;
  encrypting a session ID using the public key;
  encoding the session ID in a second two dimensional barcode;
  sending the second two dimensional barcode to the client device via the network;
  receiving from the personal user device the session ID in decrypted form;
  determining that the session ID received from the personal user device is identical to the session ID included in the second two dimensional barcode; and
  redirecting the access request from the user using the client device to a signed in account session for the user with the server computer.

* * * * *